(12) United States Patent
Hill et al.

(10) Patent No.: US 8,770,476 B2
(45) Date of Patent: Jul. 8, 2014

(54) DEVICE, SYSTEM AND METHOD FOR REDUCING AN INTERACTION TIME FOR A CONTACTLESS TRANSACTION

(75) Inventors: Trudy Hill, Foster City, CA (US); Jagdeep Singh Sahota, Rodeo, CA (US); Christian Aabye, Redwood City, CA (US); Kim R. Wagner, Sunnyvale, CA (US); Anita Ochieano, Menlo Park, CA (US); Carole Oppenlander, Pacifica, CA (US); William Chi Yuen Chan, Singapore (SG); Craig Allen Glendenning, Melbourne (AU)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 12/831,114

(22) Filed: Jul. 6, 2010

(65) Prior Publication Data
US 2010/0270374 A1 Oct. 28, 2010

Related U.S. Application Data

(62) Division of application No. 11/536,307, filed on Sep. 28, 2006, now Pat. No. 7,798,394.

(60) Provisional application No. 60/721,454, filed on Sep. 28, 2005, provisional application No. 60/807,775, filed on Jul. 19, 2006.

(51) Int. Cl.
*G06K 5/00* (2006.01)
(52) U.S. Cl.
USPC ............................ 235/380; 235/375; 235/379

(58) Field of Classification Search
USPC .......................................... 235/375, 379, 380
See application file for complete search history.

(56) References Cited

U.S. PATENT DOCUMENTS

| 5,218,637 | A  |   | 6/1993  | Angebaud et al.         |
|-----------|----|---|---------|-------------------------|
| 5,331,138 | A  | * | 7/1994  | Saroya ............ 235/449 |
| 5,844,218 | A  | * | 12/1998 | Kawan et al. ....... 235/380 |
| 5,857,152 | A  | * | 1/1999  | Everett ............. 455/406 |
| 6,012,049 | A  | * | 1/2000  | Kawan ............... 705/41 |
| 6,097,292 | A  | * | 8/2000  | Kelly et al. ........ 340/572.7 |
| 6,247,129 | B1 |   | 6/2001  | Keathley et al.         |
| 6,480,101 | B1 | * | 11/2002 | Kelly et al. ........ 340/10.2 |
| 6,727,802 | B2 | * | 4/2004  | Kelly et al. ........ 340/10.1 |

(Continued)

FOREIGN PATENT DOCUMENTS

| DE | 41 19 924 A1 | 12/1992 |
| DE | 4119924 A1 | 12/1992 |

(Continued)

OTHER PUBLICATIONS

International Search Report of PCT Application No. PCT/US2006/038047, Aug. 14, 2007, 2 pages.

(Continued)

*Primary Examiner* — Paultep Savusdiphol
(74) *Attorney, Agent, or Firm* — Kilpatrick Townsend & Stockton LLP

(57) ABSTRACT

A method. The method comprises, at a reader, performing at least one transaction-based risk management process prior to energizing a contactless interface, initiating communication with a card utilized for the contactless transaction, receiving information associated with the card, and terminating communication with the card to authorizing the contactless transaction.

20 Claims, 7 Drawing Sheets

(56) References Cited

U.S. PATENT DOCUMENTS

| | | | |
|---|---|---|---|
| 6,824,064 B2 * | 11/2004 | Guthery et al. | 235/492 |
| 6,852,031 B1 * | 2/2005 | Rowe | 463/29 |
| 6,874,685 B1 * | 4/2005 | Moreau et al. | 235/384 |
| 7,424,977 B2 * | 9/2008 | Smets et al. | 235/486 |
| 7,494,067 B1 * | 2/2009 | Zhu | 235/492 |
| 7,798,394 B2 | 9/2010 | Hill et al. | |
| 2001/0014885 A1 | 8/2001 | Yanagi | |
| 2002/0007320 A1 | 1/2002 | Hogan et al. | |
| 2002/0062284 A1 * | 5/2002 | Kawan | 705/43 |
| 2002/0066792 A1 * | 6/2002 | Guthery et al. | 235/492 |
| 2002/0152178 A1 * | 10/2002 | Lee | 705/67 |
| 2003/0071718 A1 * | 4/2003 | Kelly et al. | 340/10.1 |
| 2003/0115371 A1 * | 6/2003 | Kang et al. | 709/310 |
| 2003/0220835 A1 * | 11/2003 | Barnes, Jr. | 705/14 |
| 2004/0068472 A1 * | 4/2004 | Sahota et al. | 705/64 |
| 2005/0033688 A1 * | 2/2005 | Peart et al. | 705/39 |
| 2005/0203856 A1 * | 9/2005 | Russell | 705/67 |

FOREIGN PATENT DOCUMENTS

| | | |
|---|---|---|
| DE | 44 42 357 A1 | 6/1996 |
| DE | 4442357 A1 | 6/1996 |
| EP | 0 818 761 A1 | 1/1998 |
| EP | 0818761 A1 | 1/1998 |
| EP | 1 411 475 A1 | 4/2004 |
| FR | 2 810 139 A1 | 12/2001 |
| FR | 2810139 A1 | 12/2001 |
| JP | 05-056037 A | 3/1993 |
| JP | 06-311069 A | 11/1994 |
| JP | H10-307885 | 11/1998 |
| JP | 11-259560 A | 9/1999 |
| JP | 2000-113122 | 4/2000 |
| JP | 2001-357373 | 12/2001 |
| JP | 2002-222394 A | 8/2002 |
| JP | 2003-256746 A | 9/2003 |
| JP | 2003-532206 | 10/2003 |
| JP | 2004-038445 A | 2/2004 |
| JP | 2004-110581 A | 4/2004 |
| JP | 2004-140779 A | 5/2004 |
| JP | 2004-334775 | 11/2004 |
| JP | 2004-355486 | 12/2004 |
| JP | H07-064911 A | 3/2005 |
| JP | 2005-182128 | 7/2005 |
| WO | 98/49658 A1 | 11/1998 |
| WO | WO 98/49658 A1 | 11/1998 |
| WO | 99/38117 A1 | 7/1999 |
| WO | WO 99/38117 A1 | 7/1999 |
| WO | WO 01/82246 A2 | 11/2001 |
| WO | 03/073389 A2 | 9/2003 |
| WO | 03/073389 A3 | 9/2003 |
| WO | WO 03-081832 A2 | 10/2003 |
| WO | WO 03/081832 A2 | 10/2003 |

OTHER PUBLICATIONS

Supplementary European Search Report of EP Application No. 06815789.0, Jan. 31, 2011, 10 pages.

Search/Examination Report dated Oct. 13, 2011 from European Patent Application No. 06 815 789.0, 8 pages.

Notification of Reason(s) for Refusal dated Dec. 5, 2011 from Japanese Patent Application No. 2008-533656, 7 pages.

Kinya, Matsui, "Newest Information on EMV Specification," Electronics, Monthly Electronics Magazine, Japan, Jun. 1, 2001, vol. 46, No. 6, pp. 30-32.

Office Action (English translation) in counterpart Japanese Patent Application No. 2008-533656, dated Dec. 3, 2012, 2 pages.

Office Action (English translation) in counterpart Japanese Patent Application No. 2008-533656, dated Jul. 17, 2012, 5 pages.

Office Action, dated Aug. 13, 2013, received in connection with counterpart Japanese Patent Application No. 2013-078069, 5 pages.

Extended European Search Report issued in connection with corresponding European Application No. EP 13188555, mailed Apr. 1, 2014, 8 pages.

Rankl et al., "Handbuch der Chipkarten," in Handbuch der Chipkarten, Dec. 31, 1999, Hanser, pp. 51-53, 191-193, 416-426, and 440-441.

International Standard ISO/IEC 7816-4, Part 4: Organization, Security and Commands for Interchange; Jan. 15, 2005, pp. 31-71.

"EMV '96 Integrated Circuit Card Application Specification for Payment Systems," in EMV '96 Integrated Circuit Card Application Specification for Payment Systems, Jun. 30, 1996, Europay International S.A., pp. 30-41.

"EMV '96 Integrated Circuit Card Application Specification for Payment Systems," Jun. 30, 1996, Europay International S.A., pp. 42-141.

* cited by examiner

DEVICE, SYSTEM AND METHOD FOR REDUCING AN INTERACTION TIME FOR A CONTACTLESS TRANSACTION

CROSS-REFERENCE TO RELATED APPLICATIONS

This is a divisional application of U.S. application Ser. No. 11/536,307, filed on Sep. 28, 2006, titled "Device, System And Method For Reducing An Interaction Time For A Contactless Transaction," which claims the priority benefit of U.S. Provisional Patent Application No. 60/721,454, filed on Sep. 28, 2005, and U.S. Provisional Patent Application No. 60/807,775, filed on Jul. 19, 2006, each of which is incorporated herein by reference.

BACKGROUND

This application discloses an invention that is related, generally and in various embodiments, to a device, system and method for reducing and interaction time for a contactless transaction.

Contactless and wireless communication technologies have become more widespread in recent years. In the payment industry, contactless payments has a number of advantages over both traditional magnetic stripe technologies and contact-based chip payment protocols. For example, traditional payment contact cards are known to operate relatively slowly, and magnetic stripe cards are known to not be sufficiently secure. Each of these technologies further requires a slot in a terminal reader that must be maintained by a merchant.

Contactless payment does not require a slot in which to enter the card. The consumer retains control over the card and merely positions the card near the terminal reader whenever necessary. The traditional specifications adopted by the payment industry for contact-based chip payment generally require the consumer to position the card near the terminal reader at different times and/or for extended periods of time in order to complete a transaction. With both merchants and consumers desiring fast transaction times, contactless transactions executed in accordance with the traditional specifications fail to meet market requirements.

Merchants and consumers are also demanding the contactless transactions be more secure. Although more recently issued contactless magnetic stripe-based cards can be more secure than traditional magnetic stripe cards, such contactless magnetic stripe-based cards are typically designed only for online transactions. For contactless offline transactions executed in accordance with the traditional specifications, the transactions can be susceptible to various offline "man in the middle" types of attacks generally referred to as sleeve attacks, Trojan horse attacks, etc.

In one type of sleeve attack, a device intercepts data transmitted wirelessly from a card reader that is intended for a contactless card. The device alters the data and subsequently transmits the altered data to the card. Instead of receiving the data transmitted by the card reader, the card receives the altered data transmitted by the device. The care subsequently processes the altered data and transmits a message related to the altered data to the card reader. The card reader subsequently grants approval of the transaction based on information present in the message transmitted by the card. In another type of sleeve attack, a device intercepts data transmitted wirelessly from the card that is intended for the card reader. The device alters the data and subsequently transmits the altered data to the card reader. Instead of receiving the data transmitted by the card, the card reader receives the altered data transmitted by the device. The card reader subsequently processes the altered data and grants approval of the transaction based on information present in the altered data transmitted by the device. In other types of sleeve attacks, the device may cause a denial of service by not forwarding intercepted data to the card or the card reader.

In one type of Trojan horse attack, malicious software embedded in the card alters valid data prior to information being sent to the card reader. The card reader ultimately grants approval of the transaction based on the altered data. In another type of Trojan horse attack, malicious software embedded in the card reader alters valid data prior to the authorization process. The card reader ultimately grants approval of the transaction based on the altered data.

For a given offline transaction, a "man in the middle" attack may be utilized to reduce the amount of the transaction as ultimately recognized by the card and the card reader. For example, for a given offline transaction involving the purchase of goods from a merchant, the card reader may wirelessly transmit data intended for the card which indicates that the value of the transaction is equal to $15. However, prior to the data being received by the card, the device intercepts the data and alters the data so that the altered data indicates that the value of the transaction is equal to only $1. Upon receiving the approval, the merchant releases the goods with the belief that the approved transaction amount was equal to $15. The difference between the actual transaction amount and the reduced transaction amount may affect the amount ultimately received by the merchant from a card issuer.

SUMMARY

In one general respect, this application discloses a reader. According to various embodiments, the reader comprises a contactless interface and a transaction module. The transaction module is coupled to the contactless interface, and is structured and arranged to process a contactless transaction with less than one-half second of interaction time between a card and the reader.

In another general respect, this application discloses a card. According to various embodiments, the card comprises a transaction module structured and arranged for wireless communication, and the card is structured and arranged to operate in a chip-mode and a magnetic stripe data mode.

In another general respect, this application discloses a system. According to various embodiments, the system comprises a reader and a card. The reader comprises a contactless interface and a transaction module. The card is structured and arranged to communicate with the reader via the contactless interface. The transaction module is coupled to the contactless interface, and is structured and arranged to process a contactless transaction with less than one-half second of interaction time between the card and the reader.

In another general respect, this application discloses a method for reducing an interaction time for a contactless transaction. According to various embodiments, the method comprises, at a reader, performing at least one transaction-based risk management process prior to energizing a contactless interface, initiating communication with a card utilized for the contactless transaction, receiving information associated with the card, and terminating communication with the card prior to authorizing the contactless transaction.

In another general aspect, this application discloses a method for preventing a man in the middle attack on a contactless transaction. According to various embodiments, the method comprises receiving a dynamic signature that comprises an application transaction counter, a terminal unpredictable number, a transaction amount, a transaction currency code, and a card unpredictable number. The method also comprises receiving a card unpredictable number, recalculating the dynamic signature utilizing the card unpredictable number, and authorizing the contactless transaction offline if the dynamic signature is validated.

Aspects of the invention may be implemented by a computing device and/or a computer program stored on a computer-readable medium. The computer-readable medium may comprise a disk, a device, and/or a propagated signal.

BRIEF DESCRIPTION OF THE DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are wells known in the art, and because they do not necessarily facilitate a better understanding of the invention, a description of such elements is not provided herein.

Figure 1:
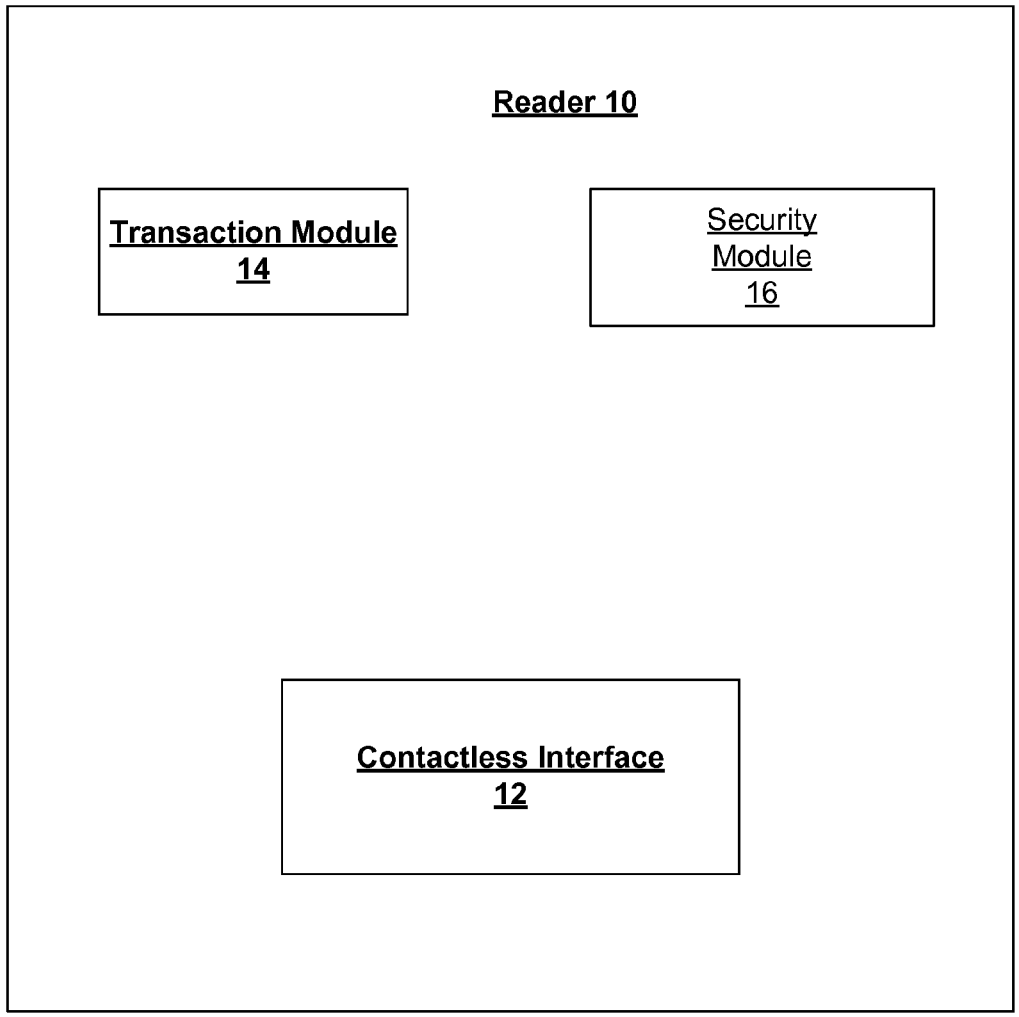
FIG. 1 illustrates various embodiments of a reader for reducing an interaction time for a contactless transaction.

FIG. 1 illustrates various embodiments of a reader 10 for reducing an interaction time for a contactless transaction. The reader 10 may be any type of device that is structured and arranged to communicate with another device via a contactless interface. According to various embodiments, the reader 10 may be merchant device that is integrated into a point-of-sale de vice. As used herein, the phrase "interaction time" refers to the interaction time between the reader 10 and another device, and does not include the time required to go online for authorization of the reader to validate a static or dynamic signature of offline data authentication. The reader 10 may be utilized with existing payment system infrastructure for markets which require transaction times faster than those associated with traditional payment protocols. According to various embodiments, the reader 10 may be utilized to reduce the interaction time to less than approximately 500 milliseconds.

The reader 10 comprises a contactless interface 12, and a transaction module 14 coupled to the contactless interface. The transaction module 14 is structured and arranged to process a contactless transaction with less than one-half of a second of interaction time between the reader 10 and another device. The transaction module 14 may also be structured and arranged to perform static data authentication and/or dynamic data authentication as described in more detail hereinbelow. According to various embodiments, the reader 10 further comprises a security module 16 coupled to the transaction module 14. The security module 16 is structured and arranged to prevent a "man in the middle" attack on a contactless transaction.

Each of the modules 14, 16 may be implemented in hardware or in firmware. According to various embodiments, the modules 14, 16 may be implemented as software applications, computer programs, etc. utilizing any suitable computer language (e.g., C, C++, Delphi, Java, JavaScript, Perl, Visual Basic, VBScript, etc.) and may be embodied permanently or temporarily in any type of machine, component, physical or virtual equipment, storage medium, or propagated signal capable of delivering instruction to a device. The software code may be stored as a series of institutions or commands on a computer-readable medium such that when a processor reads the medium, the functions described herein are performed. As used herein, the term "computer-readable medium" may include, for example, magnetic and optical memory devices such as diskettes, compact disc of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more propagated signals, and such propagated signals may or may not be transmitted on one or more carrier waves. Although the modules 14, 16 are shown in FIG. 1 as two separate modules, one skilled in the art will appreciate that the functionality of the modules 14, 16 may be combined into a single module.

Figure 2:
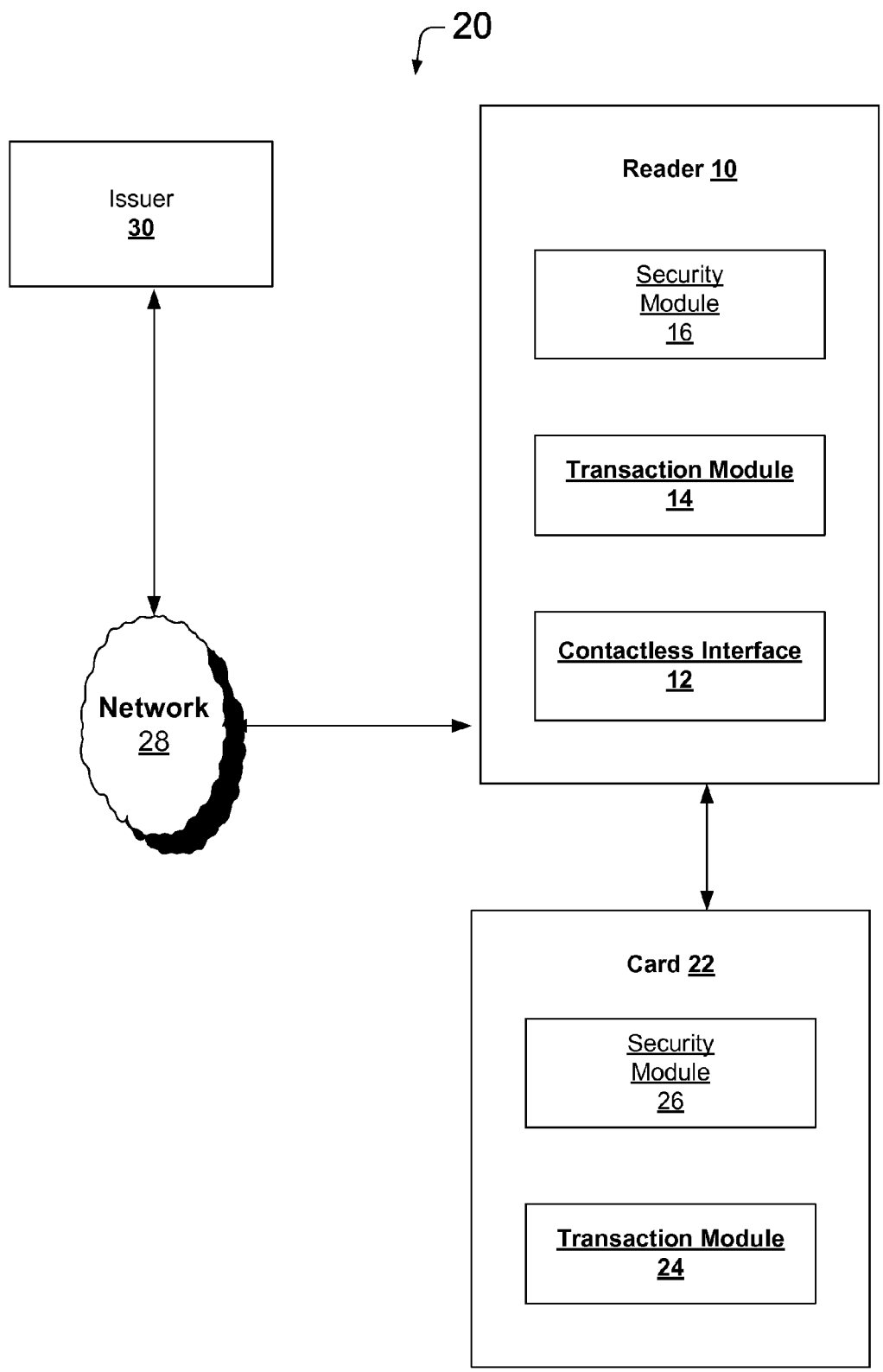
FIG. 2 illustrates various embodiments of a system for reducing an interaction time for a contactless transaction.

FIG. 2 illustrates various embodiments of a system 20 for reducing an interaction time for a contactless transaction. The system 20 comprises the reader 10 and a card 22. As used herein, the term "card" refers to any type of device that can communicate with the reader 10 over the contactless interface 12. According to various embodiments, the card 22 may be a smart card, a mobile phone, a personal digital assistant, etc. The card 22 is structured and arranged to communicate with the reader 10 via the contactless interface 12. According to various embodiments, the card 22 comprises a transaction module 24 structured and arranged to cooperate with the reader 10 to execute the contactless transaction. The card 22 may further comprise a security module 26 structured and arranged to cooperate with the reader 10 to prevent a "man in the middle attack" on the contactless transaction. The modules 24, 26 may be similar to the modules 14, 16 of the reader 10. According to various embodiments, the card 22 may be a dual mode card which is structured and arranged to operate in either a chip-mode or in a magnetic stripe data mode (utilizing Track 2 equivalent data). The mode of operation utilized by the card 22 may be determined by the card 22 based on the capabilities of the reader 10.

The system 20 may further comprise a network 28 coupled to the reader 10 and an issuer 30. The network 28 may be any suitable type of network as known in the art, may be coupled to the reader 10 in an suitable manner known in the art, and may be coupled to the issuer 30 in an suitable manner known in the art. The network 28 may include any type of delivery system including, but not limited to a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 28 may include elements, such as, for example, intermediate nodes, proxy servers, routers, switches, and adapters configured to direct and/or deliver data.

Figure 3:
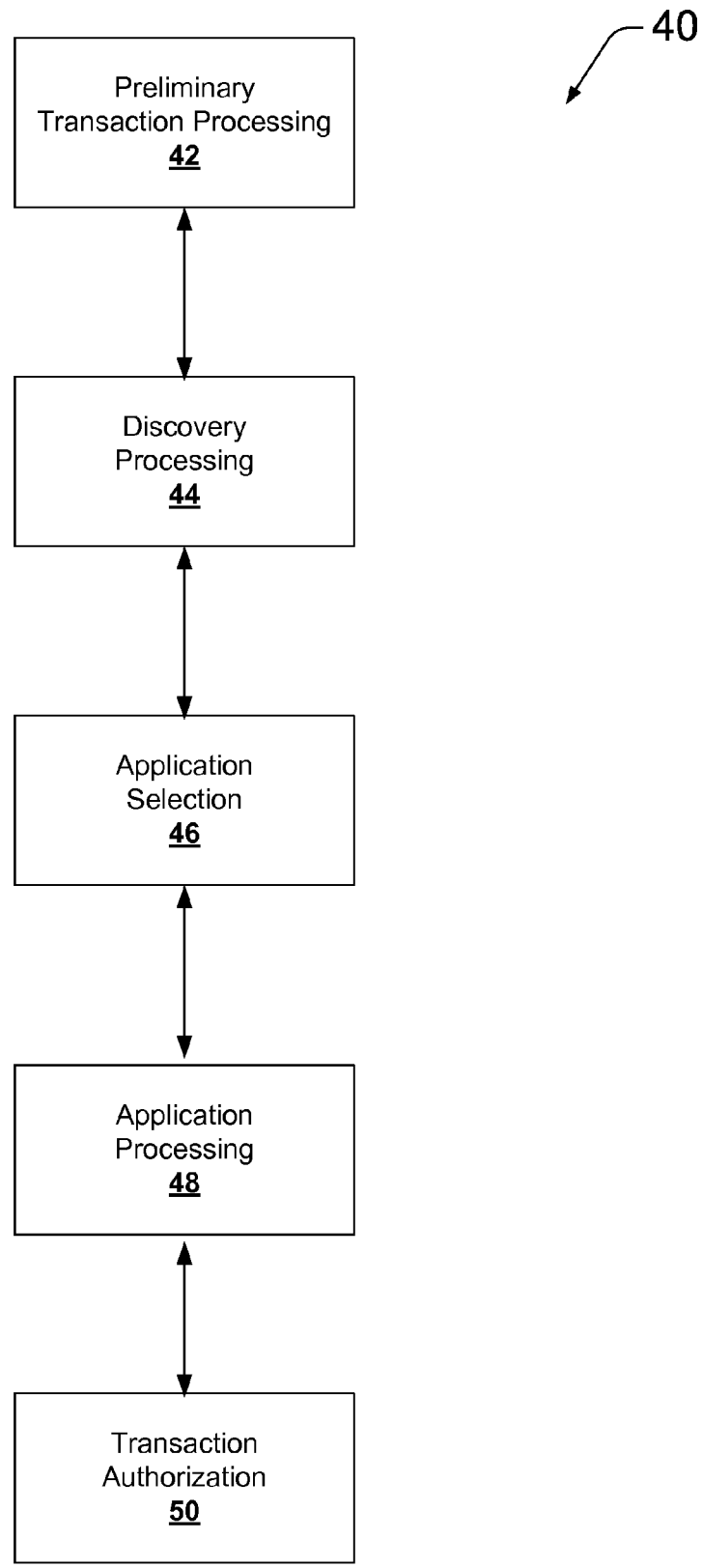
FIG. 3 illustrates various embodiments of a method for reducing an interaction time for a contactless transaction.

FIG. 3 illustrates various embodiments of a method 40 for reducing an interaction time for a contactless transaction. The method 40 may be implemented by the system 20 of FIG. 2. The method 40 comprises the general steps of preliminary transaction processing 42, discovery processing 44, application selection 46, application processing 48, and transaction authorization 50.

Figure 4:
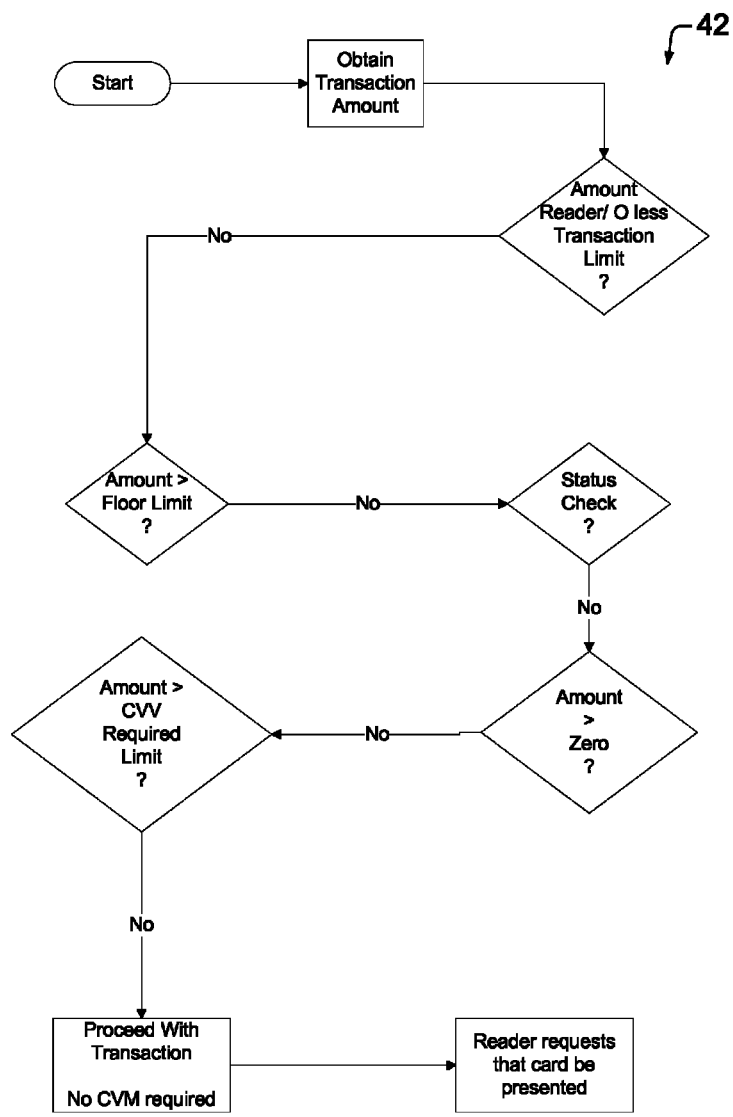
FIG. 4 is a simplified flow diagram illustrating various embodiments of a preliminary transaction processing step of the method of FIG. 3.

To minimize the interaction time between the card 22 and the reader 10 for a given transaction, the preliminary transaction processing step 42 is performed by the reader 10 before requesting that the card 22 be presented. During the preliminary transaction processing step 42, the reader 10 performs certain transaction-based risk management processes. For example, according to various embodiments, the reader 10 may obtain the transaction amount and compare the transaction amount to a transaction limit, a floor limit, a card holder verification method limit, etc. Once the preliminary transaction processing step 42 is completed, the reader 10 may prompt a cardholder to present the card 22. Based on the preliminary transaction processing, the reader 10 may request that the transaction be terminated, processed online, or processed offline. A simplified flow diagram illustrating various embodiments of the preliminary transaction processing step 42 is shown in FIG. 4.

The discovery processing step 44 follows the preliminary transaction processing step 42. Once the card 22 is presented and is within range of the reader 10, the reader 10 energizes the contactless interface 12 and establishes communication with the card 22 via the contactless interface 12 during the discovery processing step 44. If the reader 10 detects multiple contactless cards 22 within its range, the reader 10 may indicate this condition to a cardholder and may request that only one card 22 be presented for the transaction. In addition, a reader 10 may abort a transaction during the discovery processing step 44 and de-energize the contactless interface 12 upon a merchant command or after a pre-defined timeout period.

Figure 5:
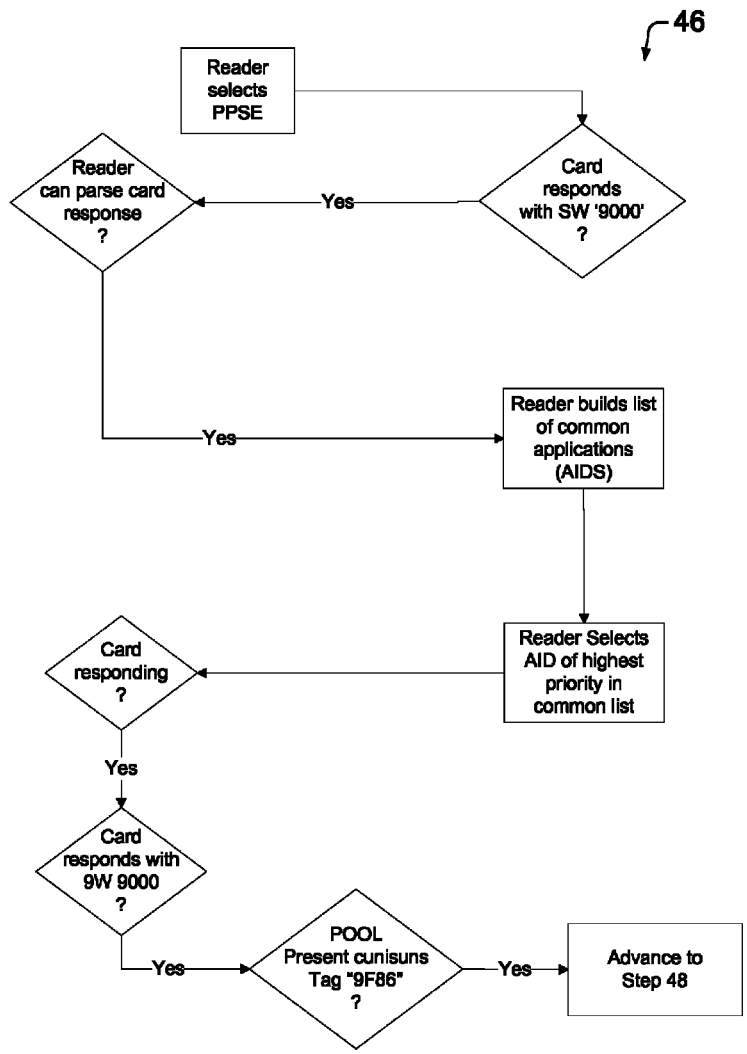
FIG. 5 is a simplified flow diagram illustrating various embodiments of an application selection step of the method of FIG. 3.

The application selection step 46 follows the discovery processing step 44. During the application selection step 46, the reader 10 transmits a first command message (e.g., SELECT PPSE) to the card 22. The first command message may serve as a request for a list of application identifies, application labels and application priority indicators for applications that are supported by the card 22 and are accessible via the contactless interface 12. Responsive to the first command message, the card 22 builds such a list and transmits the list to he reader 10. According to various embodiments, the list may be provided within file control information (FCI) transmitted to the reader 10. The reader 10 utilizes the list transmitted by the card 22 to build a list of applications common to the reader 10 and the card 22. After building the list of common applications, the reader 10 transmits a second command message (e.g., SELECT AID) to the card 22. The second command message may serve as a request to conduct the transaction utilizing a specific application from the list of common applications. According to various embodiments, the specific application may be the common application having the highest priority as indicated by the application priority indicators previously transmitted by the card 22. Responsive to the second command message, the card 22 transits a request the reader 10 to provide various details concerning the capabilities of the reader 10 and transaction specific requirements of the reader 10. According to various embodiments, the required details may be provided in a list of terminal data objects (e.g., PDOL) associated with the reader 10. If the list of terminal data objects includes a particular data element (e.g., terminal transaction qualifiers), the process advances to the application step 48. Otherwise, the reader 10 may terminate the transaction or attempt to process the transaction over another interface. A simplified flow diagram illustrating various embodiments of the application selection step 46 is shown in FIG. 5.

During the application processing step 48, the reader 10 transmits a third command message (e.g., GPO) to the card 22 responsive to the card's request for details concerning the capabilities of the reader 10 and transaction specific requirements of the reader 10. The third command message is structured such that it can be utilized in lieu of three separate commands required by previous specifications. By reducing the number of commands and responses required to complete the contactless transaction, the interaction time required between the cards 22 and the reader 10 is further minimized. The third command message may comprise values for any number of data elements requested by the card 22. Various data element values indicate the type of transactions supported by the reader 20, whether offline and/or online processing is supported or required by the reader 10, which cardholder verification methods are supported or required by the reader 10, etc. The data elements may comprise terminal transaction qualifiers, the transaction amount, a terminal unpredictable number, a transaction currency code, and any other data requested by the card 22 in its response to the second command message.

Based on the type of transactions supported by the reader 10, the card 22 then performs a number of risk-management processes associated with a particular transaction type. According to various embodiments, the risk-management processes may include checking an internal card indicator to protect against transaction tearing, comparing a value of an application currency code to a value of a transaction currency code, comparing the number of personal identification number entries to a predetermined limit, determining whether a cardholder verification method is required, comparing the transaction amount to a low value limit associated with the card 22, comparing the transaction amount to a cumulative total transaction amount associated with the card 22, comparing a value of a consecutive transaction counter to a value of a consecutive transaction limit, etc. By performing the recited risk management processes at this point in the transaction, as opposed to being performed at a later point in accordance with a traditional specification, the interaction time between the card 22 and the reader 10 is further minimized. Based on the risk-management processing, the card 22 may request that the transaction be terminated, processed online, or processed offline.

Following the completion of the risk-management processes, the card 22 builds the appropriate response to the third command message and transmits the response to the reader 10. The information included in the response may vary depending on whether the card 22 desires the transaction to be authorized online, authorized offline, or terminated. For example, when the card 22 desires the transaction to be authorized online, the response may include an application transaction counter (ATC) that indicates the number of transactions processed by the card, an application cryptogram generated by the card 22 utilizing the application transaction counter and terminal data (e.g., the terminal unpredictable number and the transaction amount) included in the third command message, an application interchange profile (AIP) that indicates support for risk management features, issuer application data, and Track 2 equivalent data, and various other data elements.

When the card 22 desires the transaction to be authorized offline, the response to the third command message may include an application transaction counter (ATC) that indicates the number of transactions processed by the card. The response may also include a dynamic signature generated by the card 22 utilizing the application transaction counter, terminal data (e.g., the terminal unpredictable number, the transaction amount, and the transaction currency) included in the third command message, and a card unpredictable number. The response may further include an application cryptogram generated by the card 22 utilizing the application transaction counter and terminal data (e.g., the terminal unpredictable number and the transaction amount) included in the third command message. In addition, the response may include an application file locator (AFL) that indicates the location of files and records related to the application, an application interchange profiles (AIP) that indicates support for risk management features, issuer application data, and various other data elements. According to various embodiments, the card 22 may increment the application transaction counter prior to its causation of the application cryptogram and the dynamic signature. If the size of the dynamic signature exceeds a predetermined threshold, the dynamic signature may be returned in authorization step 50 and resent to a fourth command message described hereinbelow. According to various embodiments, the application cryptogram generated by the card 22 comprises fewer data elements than application cryptograms utilized by previous specifications. By utilizing fewer data elements to generate the application cryptogram, overall processing time is reduced and the interaction time between the card 22 and the reader 10 is further minimized.

The authorization step 50 follows the application processing step 48. After the reader 10 receives the response to the third command message from the card 22, the card 22 may be removed from the range of the reader 10 when the transaction is to be authorized online. Therefore, the card 22 is not required to remain within range of the reader 10 while online authorization is requested and performed. By being able to remove the card 22 at this point in the transaction process, the interaction time between the card 22 and the reader 10 is further minimized. The reader 10 may then send the application cryptogram, provided by the card 22 in response to the third command message, online to the issuer 30. Based on a response subsequently received from the issuer 30, the reader 10 approves or declines the transaction.

When the transaction is to be authorized offline, the reader 10 transmits a fourth command message (e.g., READ RECORD) to the card 22 after receiving the response to the third command message from the card 22, The fourth command message may serve as a request for the records indicated in the application file locator (AFL) provided by the card 22 in response to the third command message. Responsive to the fourth command message, the card 22 transmits the appropriate records to the reader 10. When the last record is received by the reader 10, the card 22 may be removed from the range of the reader 10. Therefore, the card 22 is not required to remain within range of the reader 10 while offline authorization is performed. By being able to remove the card 22 at this point in the transaction process, the interaction time between the card 22 and the reader 10 is further minimized. The reader 10 may then check whether the card 22 is expired. If the reader 10 determines that the card 22 is not expired, the reader 10 may the perform offline data authentication. The type of offline data authentication performed, static data authentication (SDA) or dynamic data authentication (DDA), is determined based on the application interchange profile (AIP) provided by the card 22 in response to the third command message.

Figure 6:
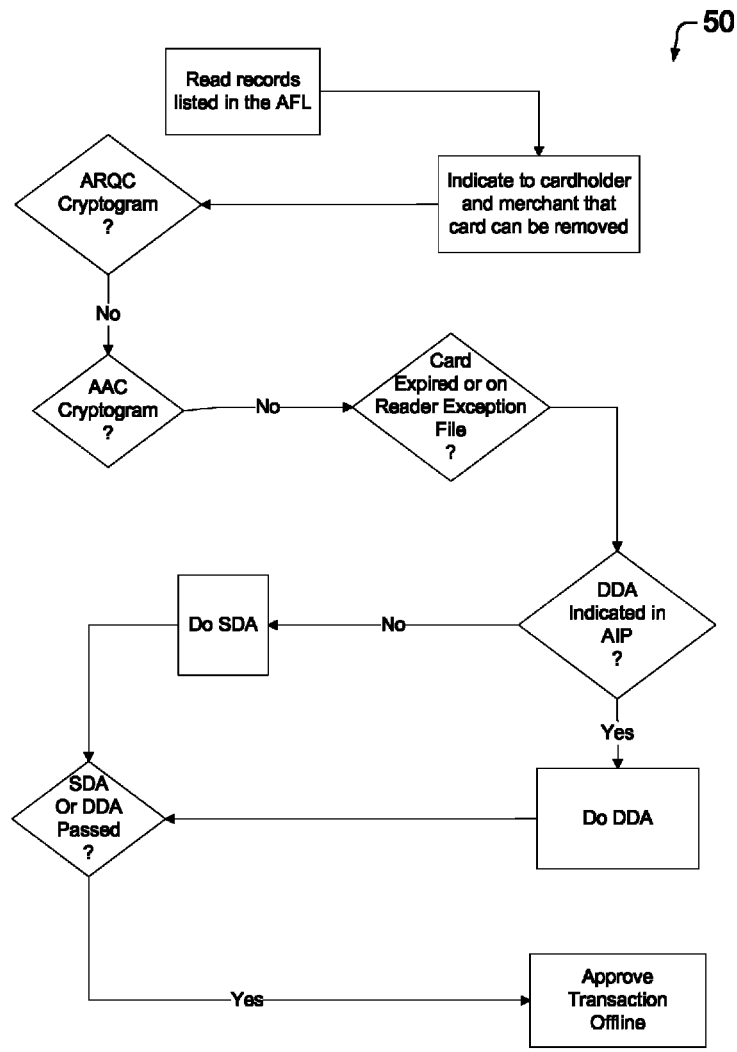
FIG. 6 is a simplified flow diagram illustrating various embodiments of an authorization step of the method of FIG. 3.

For static data authentication, the reader 10 attempts to validate the static signature provided by the card 22 in the response to the third command message. Static data authentication involves validating important application data to ensure that the data has not been fraudulently altered. If the static signature is validated, the transaction is approved offline. Otherwise, the transaction may be sent online or terminated. For dynamic data authentication, the reader 10 attempts to validate the dynamic signature provided by the card 22 in response to the third command message. Dynamic data authentication involves validating important application data to ensure that the data has not been fraudulently altered and that the card 22 is genuine. According to various embodiments, the validation of the dynamic signature may comprise utilizing the application transaction counter (ATC) and the terminal unpredictable number provided by the card 22 in the response to the third command message to recalculate the dynamic signature. According to other embodiments, the validation of the dynamic signature may comprise utilizing a card unpredictable number received from the card to recalculate the dynamic signature. If the dynamic signature is validated, the reader 10 generates a clearing message which includes the cryptogram provided by the card 22 in the response to the third command message and other related data. Otherwise, the transaction may be sent online or terminated. According to various embodiments, if the dynamic signature is not validated, the reader 10 may send the transaction online utilizing the cryptogram previously received from the card 22. Thus, the reader 10 may generate an online request with an offline cryptogram. A simplified flow diagram illustrating various embodiments of the authorization step 50 is shown in FIG. 6.

As described hereinabove, the method 40 may be utilized to minimize the interaction time between the card 22 and the reader 10 for a contactless transaction to less than approximately 500 milliseconds. To prevent an offline sleeve attack on the contactless transaction, various embodiments of the method 40 may utilize a novel type of dynamic data authentication. For offline transactions, the card 22 may utilize the application transaction counter (ATC) and the card unpredictable number, along with the terminal unpredictable number, the transaction amount and the transaction currency code included in the third command message (e.g., GPO) to create the dynamic signature. The application file locator (AFL), which is subsequently sent with the dynamic signature to the reader 10 in the response to the third command message, points to records containing the RSA certificates and data related to dynamic data authentication. Therefore, during the authentication step 50, the reader 10 may read an issuer certificate, a contactless card certificate, and data related to dynamic data authentication. According to various embodiments, the reader 10 may utilize the application transaction counter (ATC), the card unpredictable number, the terminal unpredictable number, the transaction amount and the transaction currency code received from the card 22 in response to the fourth command message to recalculate the dynamic signature for validation purposes. In instances where the contactless transaction has been subjected to a sleeve attack, the recalculation will not match the dynamic signature previously received from the card 22. For such instances, the reader 10 may decline or terminate the contactless transaction.

Figure 7:
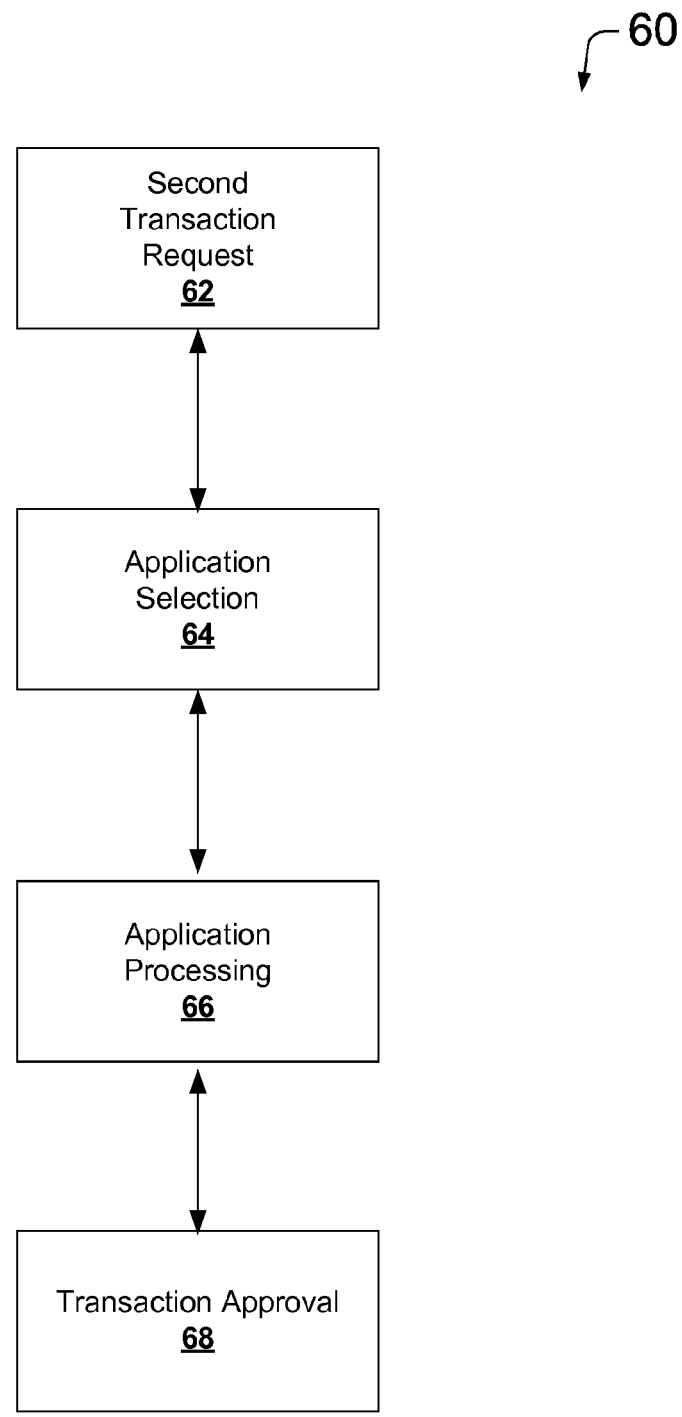
FIG. 7 illustrates various embodiments of a method for reducing an interaction time for a second contactless transaction.

FIG. 7 illustrates various embodiments of a method 60 for reducing an interaction time for a second contactless transaction that occurs following the request for online authorization at step 50 of method 40. According to various embodiments, the method 60 may comprise a portion of the method 40. The method 60 may be implemented by the system 20 of FIG. 2. The method 60 may be utilized to minimize the interaction time between the card 22 and the reader 10 for the second contactless transaction to less than approximately 500 milliseconds. According to various embodiments, the method 60 comprises the general steps of second transaction request 62, application selection 64, application processing 66, and transaction approval 68.

The second contactless transaction is not a financial transaction. As the second contactless transaction comprises the card 22 being presented within range of the reader 10 for a second time, the process may be referred to as card return processing. Prior to the start of the process, during the first transaction described hereinabove, both the reader 10 and the card 22 may indicate to one another that they support card return processing. For example, the reader 10 and the card 22 may indicate their support of card return processing during the application selection step 46 of the first transaction.

After the request for online authorization at step 50 of method 40, either the reader 10 or the card 22 (via the cardholder) may request the second contactless transaction during the second transaction request step 62. According to various embodiments, reader 10 may request the second contactless transaction during the second transaction request step 62 when an issuer response to the online authorization request comprises a message to be delivered to the card 22. Such a message may be utilized to provide updates or counter resets to the card 22, or to block the account. For example, in an online authorization response, the issuer 30 may include a script message in the response which requests that the card 22 be presented for a second time. In this manner, the issuer 30 may be able to subsequently block the account, replenish offline spending capability, increase the offline spending limit, etc. even if the card 22 has not requested that such actions be taken. To prompt the cardholder to present the card 22 for a second time, the reader 10 may display a message indicating that additional card processing time is required, a message requesting to please present the card again, etc.

According to other embodiments, the card 22 may request the second transaction in order to receive a reload when card offline spending capability becomes low. For example, when card offline spending capability becomes low, the card 22, via the cardholder, may request a reload by requesting an online authorization and providing the current available spending amount. To ensure that the card 22 being presented is the same card 22 which was presented for the first transaction, the card 22 may be authenticated during the second transaction request step 62.

The application selection 64 step follows the second transaction request step 62. The application selection step 64 of method 60 may be similar to the application selection step 46 of the method 40 described hereinabove. During the application selection step 64, the reader 10 transmits a command message (e.g., SELECT VSDC AID) to the card 22. The command message may serve as a request to conduct the second transaction utilizing a specific application from the list of common applications previously built by the reader 10. Responsive to the command message the card 22 transmits a PDOL to the reader 10. The PDOL may be similar to the PDOL transmitted to the reader 10 during the application selection step 46 of the method 40 described hereinabove. If the PDOL includes a particular data element (e.g., terminal transaction qualifiers), the process advances to the application processing step 66.

The application process step 66 follows the application selection step 64. The application processing step 66 may be similar to the application processing step 48 of the method 40 described hereinabove, but is different in that no financial transaction processing is involved. During the application processing step 66, the reader transmits another command message (e.g., GPO) to the card 22. Upon receipt of the command message, the card 22 builds an appropriate response and transmits the response to the reader 10.

The transaction approval step 68 follows the application processing step 66 According to various embodiments, if the issuer 30 decides to reload the offline spending capability associated with the card 22, the issuer 30 may transmit a response cryptogram and approve the transaction or include a script message with a message authentication code (MAC). The cryptogram or the MAC may serve to ensure that the updates, counter resets, etc. are only made to cards 22 associated with the issuer 30.

As described hereinabove, the method 60 may be utilized to change card risk parameters, card counters, card status, etc. For example, with respect to changing card risk parameters, the method 60 may be utilized to increase the offline spending limit, increase the single transaction limit, allow the card to perform transactions in two or more different currencies, change the currency conversion rate utilized, etc. With respect to changing card counters, the method 60 may be utilized, for example, to reset the offline available spending amount, etc. With respect to changing the card status, the method 60 may be utilized to block or unblock a particular application. One skilled in the art will appreciate that the method 60 may be utilized to change other parameters, counters, etc.

While several embodiments of the invention have been described herein by way of example, those skilled in the art will appreciate that various modifications, alterations, and adaptions to the described embodiments may be realized without departing from the spirit and scope of the invention defined by the appended claims. For example, according to various embodiments, the reader 10 system 20 and/or the method 40 described hereinabove may be modified to prevent analogous types of "sleeve attacks" on wireless handsets, USB fobs, and other devices which utilize the wireless transmission of information. Additionally, various embodiments of the method 60 may be utilized to process transactions related to currency conversions, loyalty programs, etc.

What is claimed is:

1. A reader comprising:
   a contactless interface;
   a transaction module coupled to the contactless interface, wherein the transaction module is configured to minimize an interaction time under 500 milliseconds for a contactless transaction between the reader and a card by:
      wirelessly sending from the reader to a card in a command message a terminal unpredictable number, transaction amount, and transaction currency;
      receiving from the card in response to the command message a wireless message with a dynamic signature generated based on an application transaction counter (ATC), the terminal unpredictable number, the transaction amount, the transaction currency, and a card unpredictable number, the dynamic signature sent with an application file locator (AFL); and then
      wirelessly transmitting from the reader to the card a read record command message to request one or more records indicated in the AFL from the card; and receiving from the card the requested one or more records requested by the read record command; and
a security module, coupled to the transaction module, configured for:
recalculating the dynamic signature; and
authorizing the contactless transaction if the dynamic signature received from card is validated.

2. The reader of claim 1, wherein the transaction module is configured to terminate communication with the card prior to performing an online authorization.

3. The reader of claim 2, wherein transaction module is configured for:
receiving a cryptogram that is based on the application transaction counter, the terminal unpredictable number, and transaction amount; and
requesting the transaction be processed online with the cryptogram if the dynamic signature is not validated.

4. The reader of claim 1, wherein the transaction module is configured to terminate communication with the card prior to performing an offline authorization.

5. The reader of claim 4, wherein the contactless transaction is authorized if the dynamic signature received from the card is equal to the recalculated dynamic signature.

6. The reader of claim 1, wherein the card is configured to operate in chip-mode for wireless communication or magnetic stripe mode.

7. The reader of claim 1, further comprising:
a network coupled to the reader.

8. The reader of claim 7, wherein the network is further coupled to an issuer.

9. The reader of claim 1, wherein the card increments the ATC before generating the dynamic signature.

10. The reader of claim 1 wherein the transaction module is configured to:
wirelessly transmit from the reader to the card a request for a list of applications that are supported by the card for conducting a transaction.

11. A system comprising:
a reader comprising:
a contactless interface;
a transaction module coupled to the contactless interface and configured to:
wirelessly send from the reader to a card in a command message a terminal unpredictable number, transaction amount, and transaction currency;
receive from the card in response to the command message a wireless message with a dynamic signature based on an application transaction counter (ATC), the terminal unpredictable number, the transaction amount, the transaction currency, and a card unpredictable number, the dynamic signature sent with an application file locator (AFL); and then
wirelessly transmit from the reader to the card a read record command message to request one or more records indicated in the AFL from the card; and
receive from the card the requested one or more records requested by the read record command; and
a security module, coupled to the transaction module, configured for:
recalculating the dynamic signature; and
authorizing the contactless transaction if the dynamic signature received from the card is validated; and
a card configured to:
send from the card to the reader the wireless message with the dynamic signature; and then
send from the card to the reader the requested one or more records requested by the read record command,
wherein the transaction module is configured to minimize an interaction time under 500 milliseconds for a contactless transaction between the reader and the card.

12. The system of claim 11, wherein the transaction module is configured to:
receive from the card a cryptogram that is based on the application transaction counter, the terminal unpredictable number, and transaction amount; and
request the transaction be processed online with the cryptogram if the dynamic signature is not validated.

13. The system of claim 11, wherein the card is configured to operate in chip-mode for wireless communication or magnetic stripe mode.

14. The system of claim 11, further comprising:
a network coupled to the reader.

15. The system of claim 14, wherein the network is further coupled to an issuer.

16. A method for minimizing an interaction time under 500 milliseconds for a contactless transaction between a reader and a card, the method comprising:
wirelessly sending from a reader to a card in a command message a terminal unpredictable number, transaction amount, and transaction currency;
receiving at the reader from the card in response to the command message a wireless message with a dynamic signature generated based on an application transaction counter (ATC), the terminal unpredictable number, the transaction amount, the transaction currency, and a card unpredictable number, the dynamic signature sent with an application file locator (AFL); and then
wirelessly transmitting from the reader to the card a read record command message to request one or more records indicated in the AFL from the card; and
receiving at the reader from the card the requested one or more records requested by the read record command; and
recalculating the dynamic signature based on the application transaction counter, the terminal unpredictable number, transaction amount, and transaction currency; and
authorizing the contactless transaction if the dynamic signature received from card by the reader is validated.

17. The method of claim 16, further comprising:
receiving a request for a second contactless transaction;
re-establishing communication between the reader and the card; and
completing the second contactless transaction with less than one-half second of interaction time between the reader and the card.

18. The method of claim 17, wherein completing the second contactless transaction changes the application transaction counter.

19. The method of claim 17, wherein the second contactless transaction is for a non-financial transaction.

20. The method of claim 16, further comprising:
wirelessly transmitting from the reader to the card a request for a list of applications that are supported by the card for conducting a transaction.

* * * * *